United States Patent
Harada

(10) Patent No.: US 9,195,287 B2
(45) Date of Patent: Nov. 24, 2015

(54) POWER SUPPLY SYSTEM HAS RELAXATION CIRCUIT WHICH IS ENABLED SIMULTANEOUSLY WITH THE OUTPUTTING OF RESET SIGNAL TO RELAX AN OUTPUT VOLTAGE

(71) Applicant: CANON KABUSHIKI KAISHA, Tokyo (JP)

(72) Inventor: Keiji Harada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 372 days.

(21) Appl. No.: 13/742,883

(22) Filed: Jan. 16, 2013

(65) Prior Publication Data

US 2013/0194841 A1  Aug. 1, 2013

(30) Foreign Application Priority Data

Jan. 30, 2012 (JP) .................. 2012-017267

(51) Int. Cl.
| | |
|---|---|
| G06F 1/26 | (2006.01) |
| H02H 7/125 | (2006.01) |
| H02M 3/156 | (2006.01) |
| H02M 3/00 | (2006.01) |
| H02M 1/36 | (2007.01) |

(52) U.S. Cl.
CPC .............. G06F 1/26 (2013.01); H02H 7/1255 (2013.01); H02M 1/36 (2013.01); H02M 3/00 (2013.01); H02M 3/156 (2013.01); *H02M 2003/1566* (2013.01)

(58) Field of Classification Search
CPC ................................ G06F 1/26; H02M 3/156
USPC .......................................... 713/300; 323/284
See application file for complete search history.

(56) References Cited

U.S. PATENT DOCUMENTS

| | | | |
|---|---|---|---|
| 6,307,360 B1* | 10/2001 | Kajiwara et al. | 323/282 |
| 6,337,563 B2* | 1/2002 | Takimoto et al. | 323/284 |
| 7,446,512 B2* | 11/2008 | Nishihara et al. | 323/233 |
| 7,492,560 B2* | 2/2009 | Hussein et al. | 361/91.1 |
| 7,508,161 B2 | 3/2009 | Harada | |
| 7,693,611 B2* | 4/2010 | Mills | 700/297 |
| 7,898,231 B2 | 3/2011 | Shoji | |
| 2009/0039859 A1* | 2/2009 | Shoji | 323/299 |

FOREIGN PATENT DOCUMENTS

| | | |
|---|---|---|
| JP | 2005-20927 A | 1/2005 |
| JP | 2005-130616 A | 5/2005 |
| JP | 2009-44448 A | 2/2009 |

* cited by examiner

*Primary Examiner* — Chun Cao
(74) *Attorney, Agent, or Firm* — Fitzpatrick, Cella, Harper & Scinto

(57) ABSTRACT

This invention is directed to a power supply apparatus and a printing apparatus, which have a function of easily relaxing an output voltage rise caused by an abrupt decrease in load current by a simple arrangement. In an embodiment of the invention, a dummy load is connected to some of power supply circuits included in the power supply apparatus. When an input voltage from a DC power supply falls below a predetermined threshold value, a power supply from the power supply circuit to an integrated circuit to which an electric power is supplied is stopped in synchronism with a reset signal output to the integrated circuit. At this time, an electric power from the power supply circuit is partially supplied to the dummy load, thereby relaxing an abrupt variation of the output voltage.

10 Claims, 6 Drawing Sheets

POWER SUPPLY SYSTEM HAS RELAXATION CIRCUIT WHICH IS ENABLED SIMULTANEOUSLY WITH THE OUTPUTTING OF RESET SIGNAL TO RELAX AN OUTPUT VOLTAGE

BACKGROUND OF THE INVENTION

1. Field of the Invention

The present invention relates to a power supply apparatus and printing apparatus, and particularly to a power supply apparatus and printing apparatus, which use a so-called back-boost type DC-DC converter and, more specifically, have a function of relaxing an output voltage rise caused by an abrupt decrease in load current.

2. Description of the Related Art

Conventionally, various methods have been proposed to cope with abrupt variations of a load current in a DC-DC converter.

For example, Japanese Patent Laid-Open No. 2005-020927 has proposed a method of detecting a drop voltage of an output voltage per unit time, and additionally inputting an electric power required to compensate for the drop voltage.

Also, Japanese Patent Laid-Open No. 2005-130616 has proposed a method in which a signal that can inform the power supply side of an abrupt change of a load current is provided on the load side, and the power supply side adjusts a reference voltage based on that signal.

Furthermore, Japanese Patent Laid-Open No. 2009-044448 has proposed a method of stopping a power supply output immediately before a load current decreases abruptly so as to relax an output voltage rise caused by the abrupt decrease in load current, which occurs during a power supply output stop process.

However, since most of these proposals aim at controlling output voltage variations caused by abrupt variations of a load current to fall within a given range on either the plus or minus side, the circuit arrangement and control method are complicated very much.

For example, in the method disclosed in Japanese Patent Laid-Open No. 2005-020927, a detector which detects a drop voltage of an output voltage per unit time, and a conversion table which is use for converting the detection result into an output duty ratio are required.

Also, in the method disclosed in Japanese Patent Laid-Open No. 2005-130616, a circuit which adjusts a reference voltage according to a change amount of a load current is required.

On the other hand, although the circuit arrangement and control method of Japanese Patent Laid-Open No. 2009-044448 are very simple, this method cannot be applied when a power supply output cannot be stopped at a timing immediately before an abrupt decrease in load current.

SUMMARY OF THE INVENTION

Accordingly, the present invention is conceived as a response to the above-described disadvantages of the conventional art.

For example, a power supply apparatus and printing apparatus according to this invention are capable of easily relaxing an output voltage rise caused by an abrupt decrease in load current by a simple arrangement.

According to one aspect of the present invention, there is provided a power supply apparatus for supplying an electric power to respective units of an apparatus based on a DC power supply generated from a commercial power supply. The power supply apparatus comprises a monitor unit configured to monitor an input voltage of the DC power supply, a reset signal configured to output a reset signal to an integrated circuit to which the electric power is supplied when the input voltage monitored by the monitor unit falls below a predetermined threshold value, a power supply circuit configured to stop supply of the electric power to the integrated circuit in synchronism with outputting of the reset signal, and a relaxation circuit, which is connected to an output of the power supply circuit, and is enabled simultaneously with outputting of the reset signal, configured to relax an output voltage variation from the power supply circuit.

According to another aspect of the present invention, there is provided a printing apparatus having the above-described power supply apparatus.

The invention is particularly advantageous since an output voltage rise caused by an abrupt decrease in load current, which occurs at a reset timing of an integrated circuit, can be easily relaxed by a simple circuit arrangement.

Further features of the present invention will become apparent from the following description of exemplary embodiments (with reference to the attached drawings).

DESCRIPTION OF THE EMBODIMENT

An exemplary embodiment of the present invention will now be described in detail in accordance with the accompanying drawings. However, a relative layout of components and the like described in this embodiment do not limit the scope of this invention unless otherwise specified.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "printing element" (to be also referred to as a "nozzle") generically means an ink orifice or a liquid channel communicating with it, and an element for generating energy used to discharge ink, unless otherwise specified.

<Inkjet Printing Apparatus (FIG. 1)>

Figure 1:
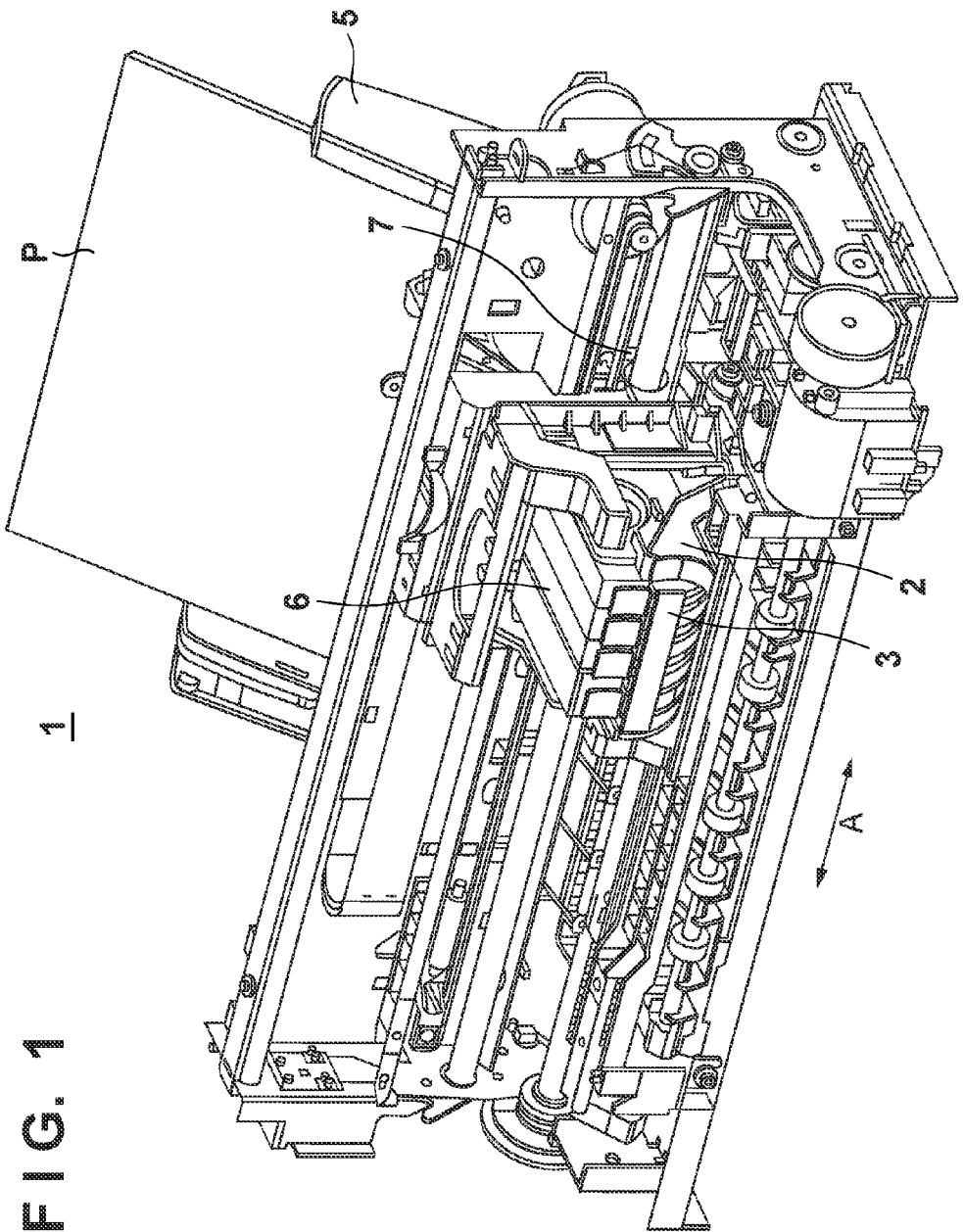
FIG. 1 is a schematic perspective view showing the arrangement of an inkjet printing apparatus as an exemplary embodiment of the present invention.

FIG. 1 is a perspective view of the outer appearance which shows an overview of the arrangement of an inkjet printing apparatus 1 as an exemplary embodiment of the present invention.

As shown in FIG. 1, the inkjet printing apparatus (to be referred to as a printing apparatus hereinafter) 1 mounts an inkjet printhead (to be referred to as a printhead hereinafter) 3, which attains printing by discharging an ink according to an inkjet method, on a carriage 2, and reciprocally moves the carriage 2 in a direction of a double-headed arrow A, thereby printing an image. A print medium P such as a print paper sheet is fed via a paper feed mechanism 5, and is conveyed to a printing position. At that printing position, the printhead 3 discharges ink onto the print medium P, thus printing an image.

On the carriage 2 of the printing apparatus 1, not only the printhead 3, but also ink cartridges 6 used to store ink to be supplied to the printhead 3 are mounted. The ink cartridges 6 are detachable from the carriage 2.

The printing apparatus 1 shown in FIG. 1 can perform a color printing operation. For this purpose, four ink cartridges which respectively store magenta (M), cyan (C), yellow (Y), and black (K) inks are mounted on the carriage 2. These four ink cartridges are independently detachable.

The printhead 3 of this embodiment adopts an inkjet method for discharging ink using a heat energy. For this reason, the printhead 3 includes electrothermal transducers. These electrothermal transducers are arranged in correspondence with respective orifices, and an ink droplet is discharged from a corresponding orifice by applying a pulse voltage to a corresponding electrothermal transducer according to a print signal.

In the example shown in FIG. 1, the printhead 3 and ink cartridges 6 are separated. Alternatively, a head cartridge which integrates a printhead and ink cartridges may be used.

<Control Arrangement of Inkjet Printing Apparatus (FIG. 2)>

Figure 2:
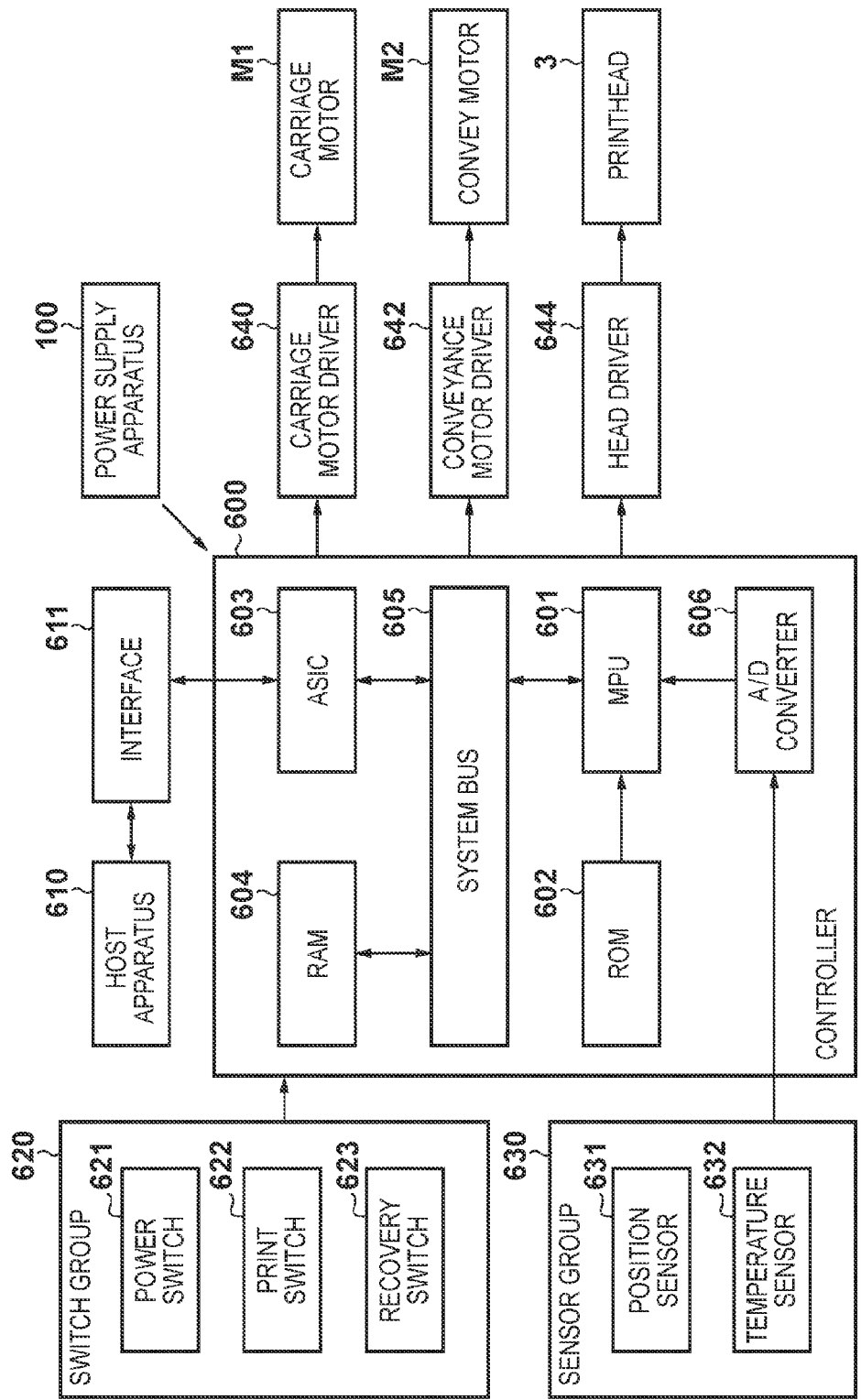
FIG. 2 is a block diagram showing the control arrangement of the printing apparatus shown in FIG. 1.

FIG. 2 is a block diagram showing the control arrangement of the printing apparatus shown in FIG. 1.

As shown in FIG. 2, a controller 600 includes an MPU 601, ROM 602, ASIC (Application Specific Integrated Circuit) 603, RAM 604, system bus 605, A/D converter 606, and the like. The ROM 602 stores a program corresponding to a control sequence, a required table, and other permanent data. The ASIC 603 generates control signals required to control a carriage motor M1, a conveyance motor M2, and the printhead 3. The RAM 604 is used as a rendering area of image data, a work area required to execute a program, and the like. The system bus 605 interconnects the MPU 601, ASIC 603, and RAM 604 to exchange data. The A/D converter 606 A/D-converts analog signals received from a sensor group (to be described later), and supplies digital signals to the MPU 601.

In FIG. 2, reference numeral 610 denotes a computer (or a reader used to read an image, a digital camera, or the like), which is used as a supply source of image data, and is called a host apparatus. The host apparatus 610 and printing apparatus 1 exchange image data, commands, status signals, and the like via an interface (I/F) 611. This image data is input in, for example, a raster format.

Furthermore, reference numeral 620 denotes a switch group, which includes a power switch 621, print switch 622, recovery switch 623, and the like.

Reference numeral 630 denotes a sensor group, which is required to detect apparatus states, and includes a position sensor 631, temperature sensor 632, and the like.

Moreover, reference numeral 640 denotes a carriage motor driver which drives the carriage motor M1 required to reciprocally scan the carriage A in the direction of the double-headed arrow A; and 642, a conveyance motor driver which drives the conveyance motor M2 required to convey the print medium P. Reference numeral 644 denotes a head driver which drives the printhead 3, based on print data and control signals transferred from the controller 600.

The ASIC 603 transfers data required to drive printing elements (discharge heaters) to the printhead 3 while directly accessing a storage area of the RAM 604 in case of print scanning of the printhead 3.

Then, a power supply apparatus 100 supplies an electric power to the controller 600. The power supply apparatus 100 can supply an electric power required to operate the respective units of the apparatus such as the respective drivers, motors, printhead, sensor group, switch group, and mechanical parts.

An embodiment of the power supply apparatus included in the printing apparatus with the above arrangement will be described below.

Figure 3:
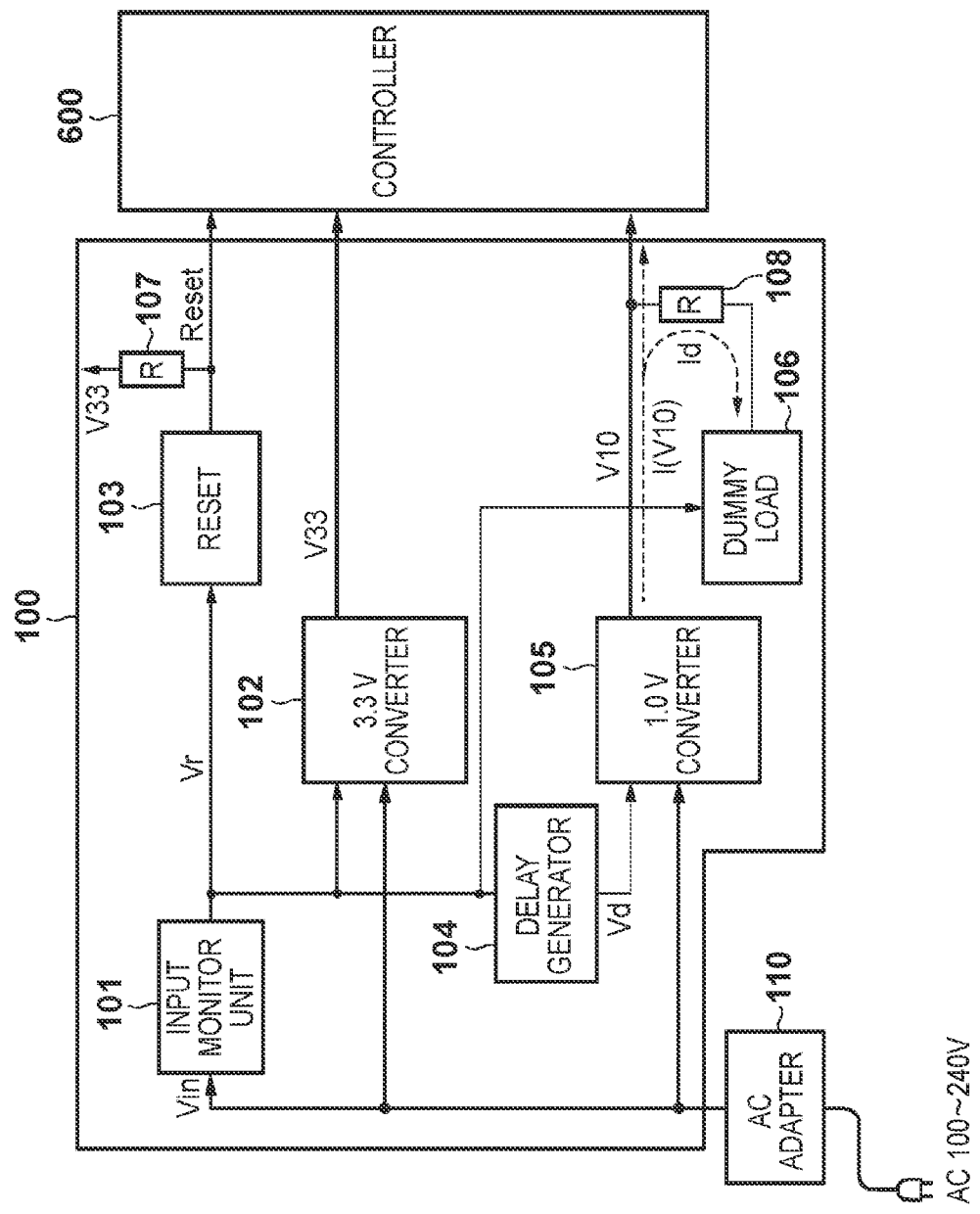
FIG. 3 is a block diagram showing the detailed arrangement of a power supply apparatus.

FIG. 3 is a block diagram showing the detailed arrangement of the power supply apparatus 100.

Referring to FIG. 3, an AC adapter 110 supplies a DC power supply Vin generated from a commercial AC power supply (100 to 240 V) to the power supply apparatus 100. The power supply apparatus 100 supplies an electric power to the controller 600 shown in FIG. 2. The power supply apparatus includes a 3.3 V converter (first voltage generation unit) 102 for generating a voltage of 3.3 V and a 1.0 V converter (second voltage generation unit) 105 for generating a voltage of 1.0 V.

In the power supply apparatus 100, an input monitor unit 101 monitors an input voltage Vin. Then, upon detection of Vin<Vth (threshold value) (that is, the input voltage which falls below the threshold value), the input monitor unit 101 outputs a signal Vr to a reset circuit 103, 3.3 V converter 102, dummy load 106, and delay generator (delay unit) 104, which are subsequent stages in the power supply apparatus 100, as a notification of that detection result. In response to the reception of the signal Vr, the 3.3 V converter 102 stops generating the voltage. In response to the reception of the signal Vr, the delay generator 104 outputs a signal Vd to the 1.0 V converter 105 so that the 1.0 V converter can stop generating the voltage after an elapse of a time Td since the 3.3 V converter 102 stops generating the voltage.

The reset circuit 103 outputs a reset signal (Reset) to a reset terminal of the controller 600 based on the detection result of the input monitor unit 101.

The reset signal (Reset) is connected to an output V33 of the 3.3 V converter 102 via a resistor (R) 107. For this reason, when the input monitor unit 101 detects Vin<Vth, and a constant current is supplied to the reset circuit 103, a voltage is driven from 3.3 V to 0 V. At this time, the controller (integrated circuit) 600 is reset to stop all operations. For this reason, a current, which is consumed by the controller 600 by the voltage V33 from the 3.3 V converter 102 and a voltage V10 from the 1.0 V converter 105, abruptly decreases.

In this case, the voltage V33 is used as a 3.3 V power supply for an external I/O circuit of the controller 600, and the voltage V10 is used as a 1.0 V power supply for an internal core circuit of the controller 600. Therefore, the 3.3 V converter 102 and 1.0 V converter 105 respectively operate as a first power supply circuit and second power supply circuit with respect to the controller 600. According to a stop sequence in the controller 600, the operation of the external I/O circuit first stops, and then the operation of the internal core circuit stops. This stop sequence can prevent the controller 600 from unexpectedly outputting an undesirable signal when the operation of the controller 600 stops.

The 3.3 V converter 102 is a so-called back-boost type DC-DC converter, and lowers the input voltage Vin to generate the voltage V33 of a direct current voltage (DC) of 3.3 V.

Figure 4A:
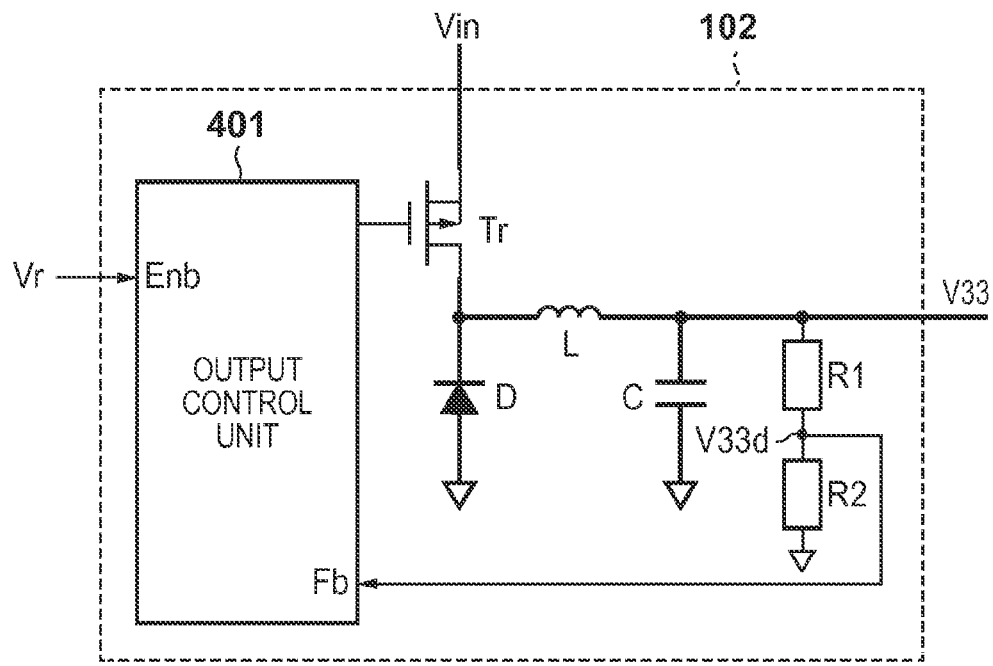
FIGS. 4A and 4B are circuit diagrams for explaining the two arrangements of a DC-DC converter.
Figure 4B:
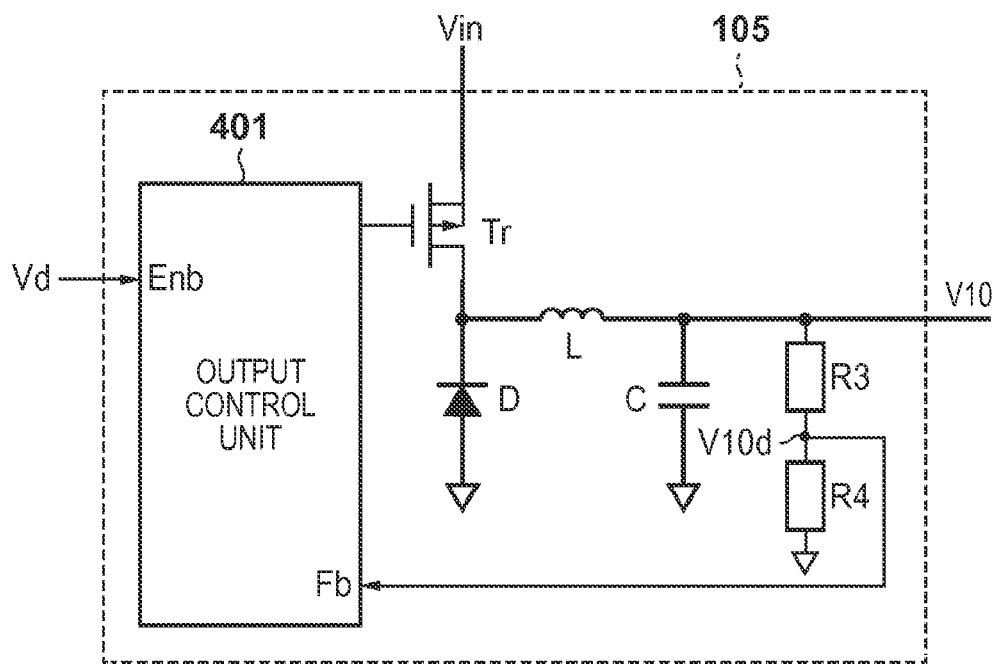

FIGS. 4A and 4B are circuit diagrams showing the two arrangements of a general DC-DC converter of the same type (asynchronous rectifier-type). FIG. 4A shows the detailed arrangement of the 3.3 V converter 102, while FIG. 4B shows the detailed arrangement of the 1.0 converter 105.

Referring to FIG. 4A, a transistor Tr performs a switching operation according to an output from an output control unit 401, and intermittently supplies an electric power to the subsequent circuit. A diode D regenerative-supplies an electric power accumulated on a choke coil L to the subsequent circuit when the transistor Tr is OFF. A capacitor C smoothes a pulsating current generated by the switching operation of the transistor Tr. The transistor Tr is, for example, an FET type transistor.

The output control unit 401 has an Enb-terminal for receiving the signal Vr and an Fb-terminal for receiving a voltage V33d (which is voltage-divided by R1 and R2) corresponding to the output voltage V33. The output control unit 401 controls ON/OFF of the transistor Tr so as to maintain the voltage V33 to be constant based on the voltage V33d while the signal Vr received by the Enb-terminal is at an active level (high level). When the signal Vr received by the Enb terminal is at an inactive level (low level), the output control unit 401 turns off the transistor Tr.

Assume that in this embodiment, when the input monitor unit 101 detects Vin<Vth, the inactive level is recognized, and the transistor Tr is turned off.

Referring back to FIG. 3, the delay generator 104 is a delay circuit, and transfers the detection result of Vin<Vth of the input monitor unit 101 to the 1.0 V converter 105 by delaying that result by a delay time.

The 1.0 V converter 105 is a back-boost type DC-DC converter as in the 3.3 V converter 102, and lowers the input voltage Vin to generate a voltage V10 of a direct current (DC) voltage of 1.0 V. The DC voltage V10 is turned off after an elapse of the time Td since detection of Vin<Vth by the input monitor unit 101. Since the circuit arrangement in FIG. 4B is in principle the same as that in FIG. 4A, the description thereof is omitted. The characteristic operation in FIG. 4B will now be described. An Enb-terminal of an output control unit 401 in FIG. 4B receives the signal Vd. An Fb-terminal of the output control unit in FIG. 4B receives the voltage V10d (which is voltage-divided by resistors R3 and R4) corresponding to the output DC voltage V10.

The dummy load 106 is a pseudo-load circuit connected to the output voltage V10 of the 1.0 V converter 105, and is supplied with a current by the voltage V10 via a resistor (R) 108 when the input monitor unit 101 detects Vin<Vth.

The operation of the power supply apparatus 100 with the arrangement shown in FIG. 3 will be described below.

Figure 5:
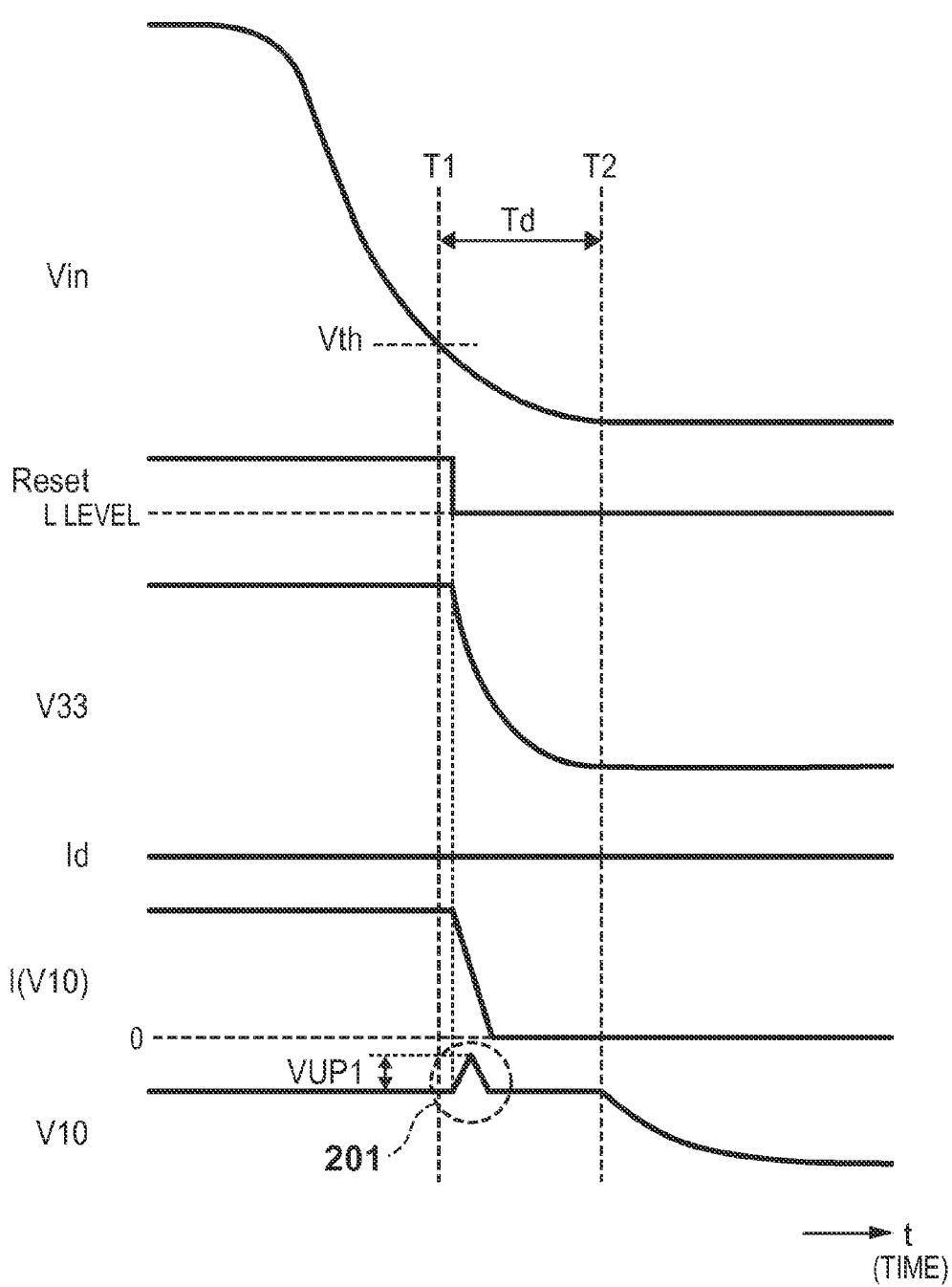
FIG. 5 is a waveform chart for explaining operation waveforms without an output voltage variation relaxing function.
Figure 6:
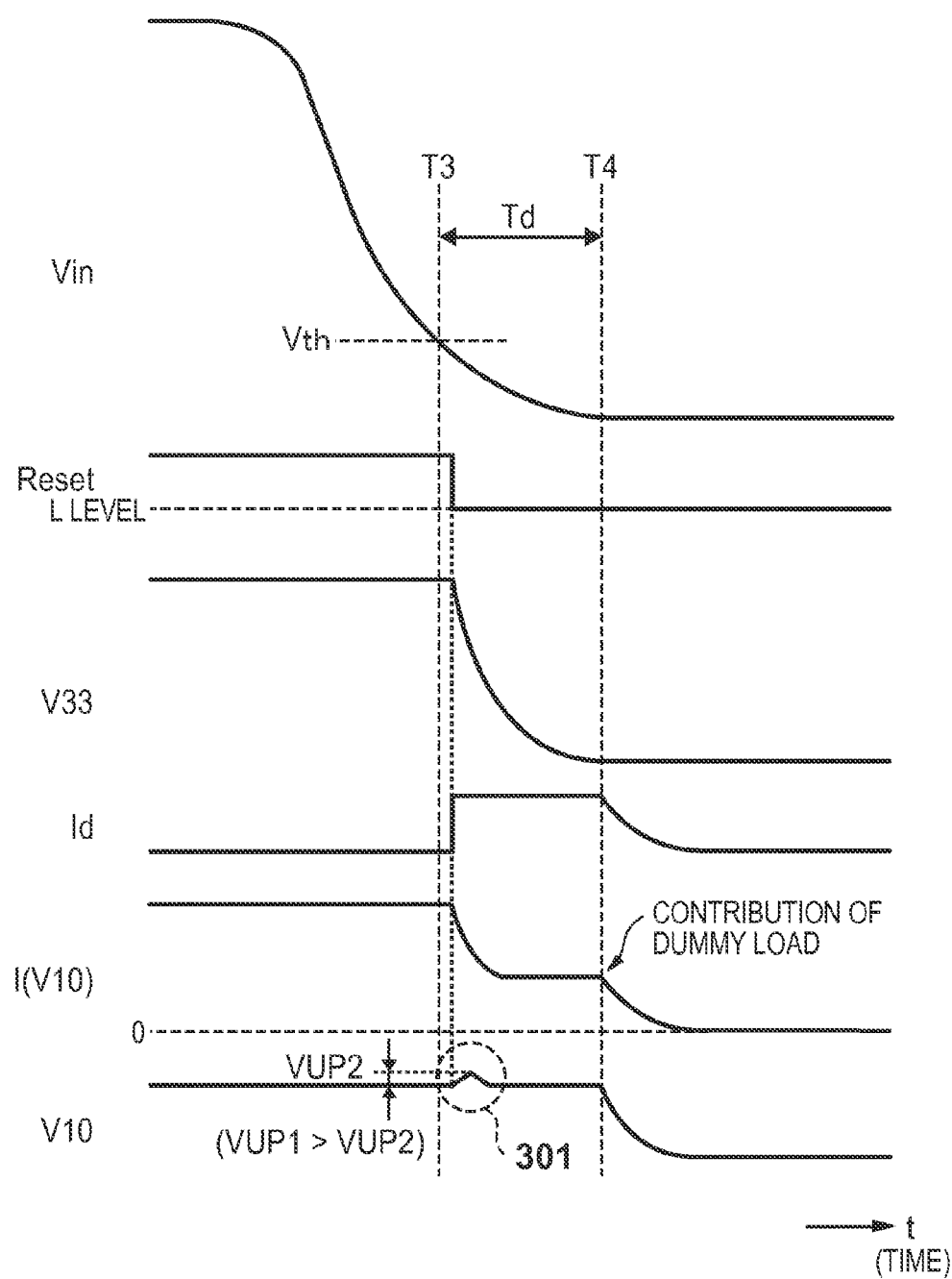
FIG. 6 is a waveform chart for explaining operation waveforms with the output voltage variation relaxing function.

FIG. 5 is a chart showing various signal waveforms when the power supply apparatus 100 does not include any output voltage variation relaxing function, and FIG. 6 is a chart showing waveforms when the apparatus 100 includes that relaxing function.

Waveforms shown in FIG. 5 (without any output voltage variation relaxing function) will be described first.

When an AC cord of the AC adapter 110 is plugged off from the AC power supply, the power supply voltage Vin of the power supply apparatus 100 gradually decreases. When Vin<Vth (t=T1), the power supply apparatus 100 drives the reset signal (Reset) to L (low) level, and stops outputting the voltage V33 (3.3 V). For this reason, voltage V33 drops. More specifically, in response to the signal Vr outputted from the input monitor unit 101, the reset circuit 103 drives the reset signal (Reset) to the L level, and the 3.3 V converter 102 stops outputting the voltage V33 (3.3V). Note that although this embodiment uses the reset signal as an example, an instruction signal other than the reset signal which causes the controller 600 to change into a power-saving state may be used.

At this time, since the controller 600 is reset to stop all the operations, the electric power consumption in the controller 600 abruptly decreases. In other words, a consumption current of the voltages V33 and V10 in the controller 600 abruptly decreases. In FIG. 5, I(V10) represents a consumption current waveform of the voltage V10. As can be seen from FIG. 5, the current I(V10) abruptly drops to zero load current after the reset signal (Reset) is driven to L level. Due to this abrupt decrease in load current, the 1.0 V converter 105 falls into an excessive power supply state, and as a result, the voltage V10 is raised by a voltage Vup1, thereby outputting a signal pulse (201 in FIG. 5). This is generated by an inductance of a coil provided in the 1.0 V converter 105.

Waveforms shown in FIG. 6 (with the output voltage variation relaxing function) will be described below.

When Vin<Vth (t=T3) during a process in which Vin gradually decreases in the same manner as in FIG. 5, the power supply apparatus 100 drives the reset signal (Reset) to L level, and stops outputting the voltage V33 (3.3 V). At the same time, the power supply apparatus 100 enables the dummy load 106. The dummy load 106 is provided between the resistor 108 and a ground, and operates based on the signal Vr thereby consuming an electric power in the voltage V10. The dummy load is a driving element, for example, a transistor.

At this time, the controller 600 is reset, and a consumption current of the voltages V33 and V10 in the controller 600 abruptly decreases in the same manner as in FIG. 5. However, as for the consumption current of the voltage V10, since a decrease in the consumption current by the controller 600 is compensated for by a dummy load current Id generated by the operation of the dummy load 106, a decrease width of the consumption current is reduced by the dummy load current Id (1.0 V÷a value of the resistor R108). The value of the resistor R108 is determined based on a current value of a consumed electric power when the controller 600 operates.

In FIG. 6, I(V10) represents a consumption current waveform of the voltage V10 at that time. As shown in FIG. 6, although a load current abruptly decreases at a timing (t=T3) at which the reset signal (Reset) is driven to L level, the current I(V10) does not drop to zero unlike in FIG. 5, and a decrease in current I(V10) is stopped at an electric current level higher by an amount compensated for by the dummy load.

As described above, the dummy load consumes an electric power supplied from the 1.0 V converter 105, thereby maintaining a load current. In this manner, a degree of the excessive power supply state of the 1.0 V converter 105 can be relaxed. As a result, a rise width of the voltage V10 can be suppressed into a voltage Vup2 lower than the voltage Vup1 (301 in FIG. 6).

Therefore, according to the aforementioned embodiment, an output voltage rise caused by an abrupt decrease in load current, which occurs at a reset timing of the controller, can be easily relaxed by a simple arrangement, that is, by arranging the dummy load as a component which performs the output voltage variation relaxing function.

Even when a controller requires respective power supplies for an external I/O circuit and internal core circuit, and a power-OFF instruction is required to turn off the power supply for the external I/O circuit first and then the power supply for the internal core circuit, the same advantages can be obtained as follows. That is, as described in the above embodiment, a dummy load is connected to the power supply (1.0 V) for the internal core circuit, and is enabled at an OFF timing of the power supply (3.3 V) for the external I/O circuit, thereby supplying a predetermined load current to the dummy load. Thus, a rise of an internal core voltage (1.0 V) caused by an abrupt decrease in load current due to resetting, which occurs at an OFF timing of the power supply for the external I/O circuit, can be relaxed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-017267, filed Jan. 30, 2012, which is hereby incorporated by reference herein in its entirety.

What is claimed is:

1. A power supply apparatus, comprising:
a monitor unit configured to monitor an input voltage of a DC power supply;
a reset signal circuit configured to output a reset signal to an integrated circuit to which an electric power is supplied when the input voltage monitored by said monitor unit falls below a predetermined threshold value;
a power supply circuit configured to stop supply of the electric power to the integrated circuit in synchronism with outputting of the reset signal; and
a dummy element, connected to a line between said power supply circuit and the integrated circuit,
wherein said dummy element is enabled based on reception of the reset signal, and
a value of an electric current from said power supply circuit caused by enablement of said dummy element decreases from a first value to a second value, and the value decreases from the second value to a third value after an elapse of a predetermined time.

2. The apparatus according to claim 1, wherein said power supply circuit includes a first power supply circuit and a second power supply circuit having different output voltages.

3. The apparatus according to claim 2, wherein said first power supply circuit and said second power supply circuit are respectively back-boost type DC-DC converters.

4. The apparatus according to claim 2, wherein an output voltage from said first power supply circuit is higher than an output voltage from said second power supply circuit,
said first power supply circuit serves as a power supply for an external I/O circuit of the integrated circuit, and
said second power supply circuit serves as a power supply for an internal core circuit of the integrated circuit.

5. The apparatus according to claim 1, wherein the power supply circuit contains a coil.

6. The apparatus according to claim 1, wherein said dummy element is enabled simultaneously with reception of the reset signal.

7. A printing apparatus having a power supply apparatus according to claim 1.

8. A power supply apparatus comprising:
a voltage generation unit configured to, based on a first voltage, generate a second voltage to be supplied to an external unit of the power supply apparatus;
a monitor unit configured to monitor the first voltage;
a signal generation unit configured to generate a signal causing the external unit to change into a power-saving status in a case where the first voltage monitored by said monitor unit falls below a predetermined threshold value; and
a dummy element connected to a line between said voltage generation unit and the external unit,
wherein said dummy element is enabled based on the signal generated by said signal generation unit, and
a value of an electric current from said voltage generation unit caused by enablement of said dummy element decreases from a first value to a second value, and the electric current value decreases from the second value to a third value after an elapse of a predetermined time.

9. The apparatus according to claim 8, wherein said voltage generation unit contains a coil.

10. A printing apparatus having a power supply apparatus according to claim 8.

* * * * *